United States Patent [19]
Licht

[11] Patent Number: 5,947,041
[45] Date of Patent: Sep. 7, 1999

[54] METHOD FOR USING TREE CROPS AS POLLUTANT CONTROL

[76] Inventor: Louis A. Licht, 611 Brookside Dr., Iowa City, Iowa 52245

[21] Appl. No.: 07/650,453

[22] Filed: Feb. 4, 1991

[51] Int. Cl.$^6$ ................................. C02F 3/32; B09B 1/00
[52] U.S. Cl. ...................... 111/200; 111/900; 47/DIG. 3; 210/602; 405/129
[58] Field of Search .................................. 111/200, 900, 111/919; 405/129; 210/602, 903, 912; 47/DIG. 3; 252/631

[56] References Cited

U.S. PATENT DOCUMENTS

| | | | |
|---|---|---|---|
| 4,839,051 | 6/1989 | Higa | 210/602 |
| 4,904,386 | 2/1990 | Kickuth | 210/602 |
| 4,970,000 | 11/1990 | Eppler et al. | 210/903 |
| 4,995,969 | 2/1991 | LaVigne | 210/602 |
| 5,011,604 | 4/1991 | Wilde et al. | 210/602 |
| 5,078,881 | 1/1992 | Augustine et al. | 210/602 |

FOREIGN PATENT DOCUMENTS

| | | | |
|---|---|---|---|
| 3423226 | 12/1985 | Germany | 210/602 |
| 63762 | 6/1978 | Japan | 210/602 |
| 70891 | 4/1983 | Japan | 210/602 |
| 238198 | 11/1985 | Japan | 210/602 |
| 701947 | 12/1979 | U.S.S.R. | 210/602 |
| 1289823 | 2/1987 | U.S.S.R. | 210/602 |
| 1521383 | 11/1989 | U.S.S.R. | 111/900 |

OTHER PUBLICATIONS

Successful Farming, "Dollars From Filter Strips," Feb. 1992, pp. 36 and 37.
Selected Abstracts from Database Search, Including "Nitrogen Fixing Research Reports 1988," Concerning Root Initials and Depth of Planting.
Selected Abstracts from Database Search Concerning Filter Strips.
Organic Gardening, "Taking Hardwood Cuttings", pp. 26–27, Nov. 1989.

*Primary Examiner*—Anthony Knight
*Attorney, Agent, or Firm*—Zarley, McKee, Thomte, Voorhees & Sease

[57] ABSTRACT

A method of naturally removing or inhibiting pollutants is described. Tree stems from trees having preformed root initials and a perennial root system are planted adjacent to or intersecting near surface ground water supply, at the area where water is to be decontaminated or at the source of pollution. The stems are planted densely to achieve maximum pollution control and environmental affects. Row planting is used and the crop harvested on a rotating basis.

4 Claims, 3 Drawing Sheets

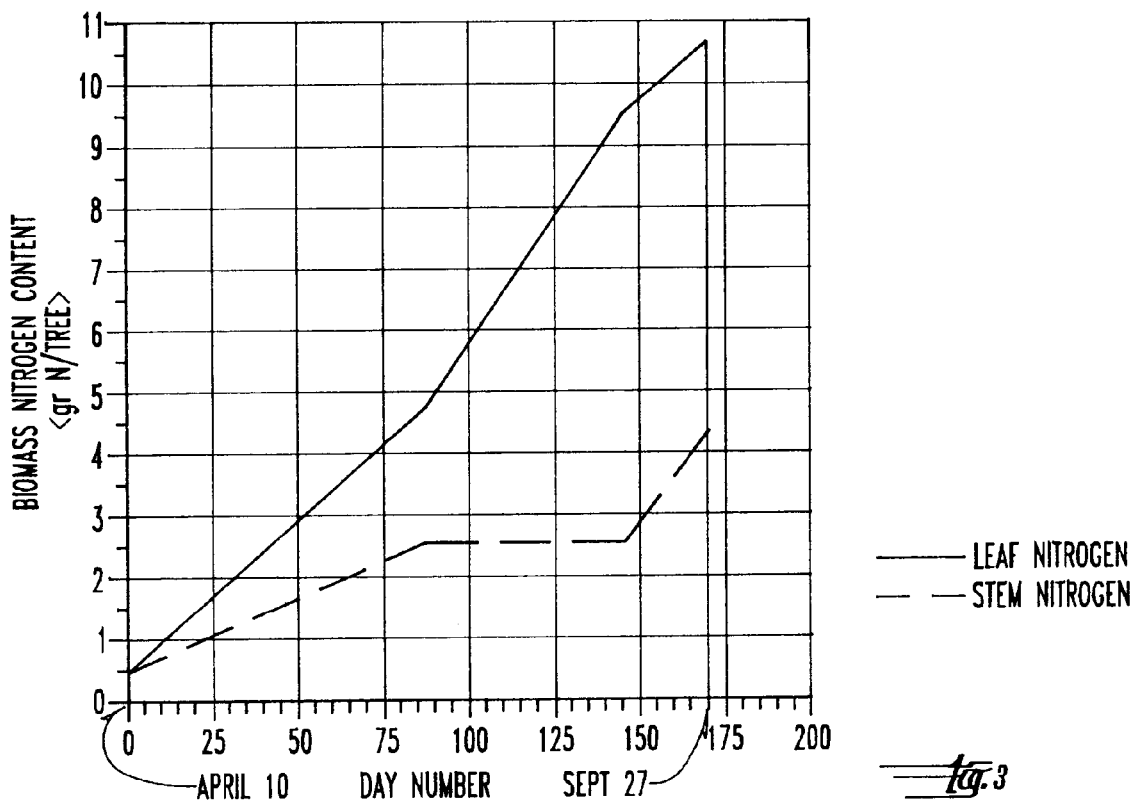
_fig. 3_
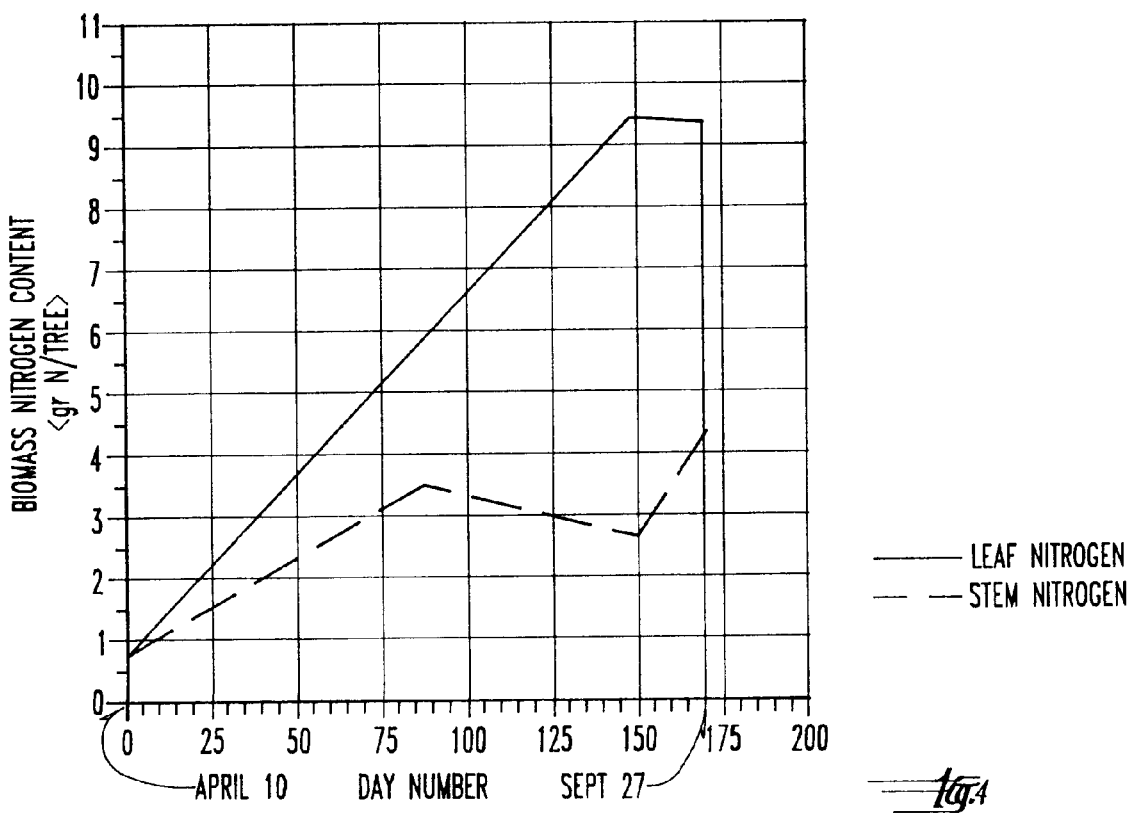
_fig. 4_

METHOD FOR USING TREE CROPS AS POLLUTANT CONTROL

BACKGROUND OF THE INVENTION

Over the years there has arisen increasing concern on the part of scientists, environmentalists, and the general public as to the condition of our environment, and the adverse impact that humans have had upon it. Some of this concern has been directed toward the destruction of forests and trees which provide oxygen for our atmosphere, and toward the introduction of environmental pollutants, especially those entering surface water and eventually drinking water supplies. Pollutants can be from point sources, like a pipe, or they can be non-point sources such as runoff from fields or diffuse leakage from landfills or septic systems. Non-point source pollutants are currently a major source of contamination of American drinking water. A number of pollutants enter waterways as a result of the use of chemicals on crop land. This is especially true of nitrates, used as fertilizers on crops. In agricultural states such as Iowa for example, nitrate-nitrogen is the number one pollutant of drinking water exceeding EPA-defined drinking water standards. The nitrogen fertilizers are but one of a number of chemicals that are injected in or on the soil or sprayed on crops, and then enter the near surface ground water and travel to nearby streams and therefore ultimately may reach drinking water supplies. Once in the drinking water supply the most commonly used method of removing such pollutants is to treat the water at treatment plants before it is presented to the general public. Often such treatment is not done due to expense for nitrate removal, resulting in public exposure of nitrate-nitrogen in the drinking water supply. This is only one example of the numerous pollutants which can enter ground water supplies causing contamination.

At the same time, conservationists seek to prevent the destruction of forests since trees provide, among other benefits, carbon dioxide uptake and oxygen production for our atmosphere as well as wildlife habitat, erosion control, and wind shelter. A variety of measures have been taken to try to encourage the planting of trees in order to obtain these advantages. However, in times of economic distress and cuts into governmentally supported conservation programs, it can be difficult to provide incentives for using valuable land to grow trees. By way of example, one half of the amount allocated for such environmental farm programs have been cut in recent years from the farm budget.

This invention is related to solving each of these problems in a unique and holistic way. It provides for a natural means of removing pollutants, or stabilizing such pollutants, in order to prevent them from traveling through the near surface ground water to nearby streams and ultimate drinking supplies. It does this by using particular types of trees planted in a particular manner as illustrated in FIG. 5, below described, in order to achieve maximum removal of pollutants from near surface ground water. Further, the trees may be used as a harvestable crop, providing, among other products, a renewable source of fuel or feed or pulp or industrial feedstock. This crop value provides to the land owner a quicker return on the investment of setting aside land for a tree buffer strip. By using this natural means of removing pollutants, one additionally achieves the advantages of providing a wildlife habitat, soil stabilization, a wind buffer, a sink for carbon dioxide, and a source of oxygen for the atmosphere, to say nothing of the visual enhancement provided by trees.

The method described here selects for trees with preformed root initials (members of Salicaceae family) capable of growing roots to prescribed depths; and, the manner of planting employed allows an extensive root system to reach very deep levels within the soil. In this manner, an extensive root system can reach down to the near surface ground water, and in fact grow beneath the water table (phreatic surface). The method employed, shown in FIG. 6, allows extensive deep root systems to grow at such levels without dying. By pre-selecting the trees, buffer location, planting them in the manner described, and harvesting them as indicated, a natural and relatively passive method of pollutant removal is achieved while at the same time providing a renewable crop, and its own source of economic return.

Accordingly, it is an object of this invention to provide a natural means of pollutant removal from near surface ground water.

Another object of the invention is to provide a renewable, sustainable crop while removing or inhibiting pollutants.

Yet another object of the invention is to provide an economical means of pollutant removal or inhibition.

A still further object of the invention is to provide for a method of pollutant removal or inhibition which additionally provides environmental benefits.

Still further objects of the invention will become apparent in the following disclosure.

DESCRIPTION OF THE DRAWINGS

FIG. 3 shows stem and leaf mass per tree planted with one foot stem cuttings.

FIG. 4 is a graph showing stem and leaf nitrogen mass per tree planted with five foot stem cuttings.

SUMMARY OF THE INVENTION

The invention relates to a method of removing or inhibiting pollutants in near surface ground water by planting trees in the Salicaceae family Populus spp. and Salix spp. having preformed root initials. The trees selected are capable of regrowth from stumps (coppicing) and are capable of fast wood growth with significant nutrient and water uptake. The trees are planted deep into the soil where the near-surface ground water is located. Preferably, the cut tree stem is planted with two or more viable buds above ground, and is preferably planted so that the opposite end of the stem cutting is greater than 18 inches below the soil surface. Depths of 5 feet deep and deeper have been used to place roots in the near surface ground water. The cuttings are planted densely to provide for a maximum pollutant uptake or inhibition, as well as other environmental benefits. The stems are planted in rows of a width to allow tractors and other farm equipment to be used to cultivate the resulting crop. The resulting trees are then harvested, usually on either a biennial or triennial basis, with no more than half of the crop removed at one time. Because of the type of tree stem cuttings selected, there is fast regrowth in order to maintain the environmental and economic benefits. The crop itself is used in any one of various products, and may be used, for example, as a renewable fuel source.

DETAILED DESCRIPTION OF THE INVENTION

This invention achieves a number of different goals and does so by selecting a particular type of tree, and planting it in a particular manner, as well as harvesting the tree as a crop on a regular basis. By the method which is described here, one can remove or inhibit pollutants in near surface ground water, and do so with an economically viable renewable crop, while also providing a number of environmental benefits such as wildlife habitat, wind shelter, soil stabilization, and other related benefits.

Figure 5:
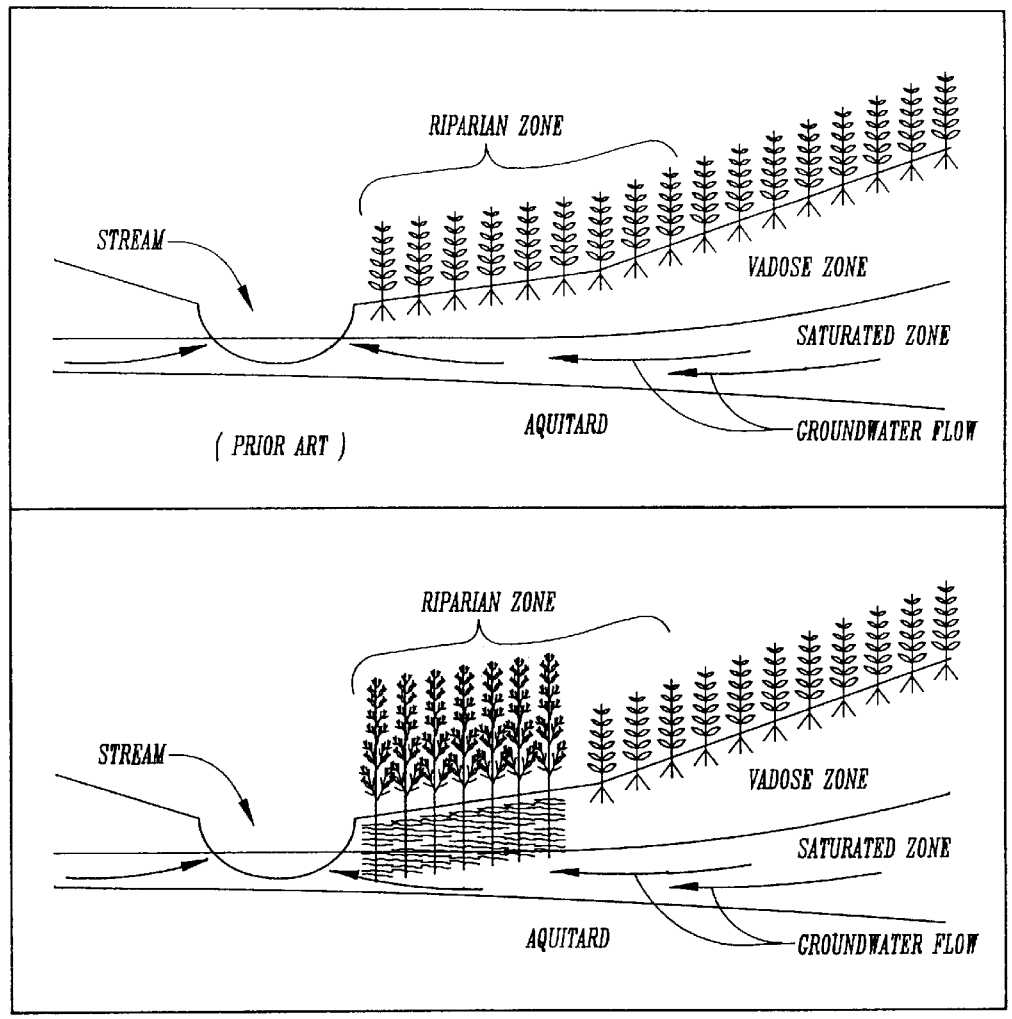
FIG. 5 shows a schematic buffer installation.
Figure 6:
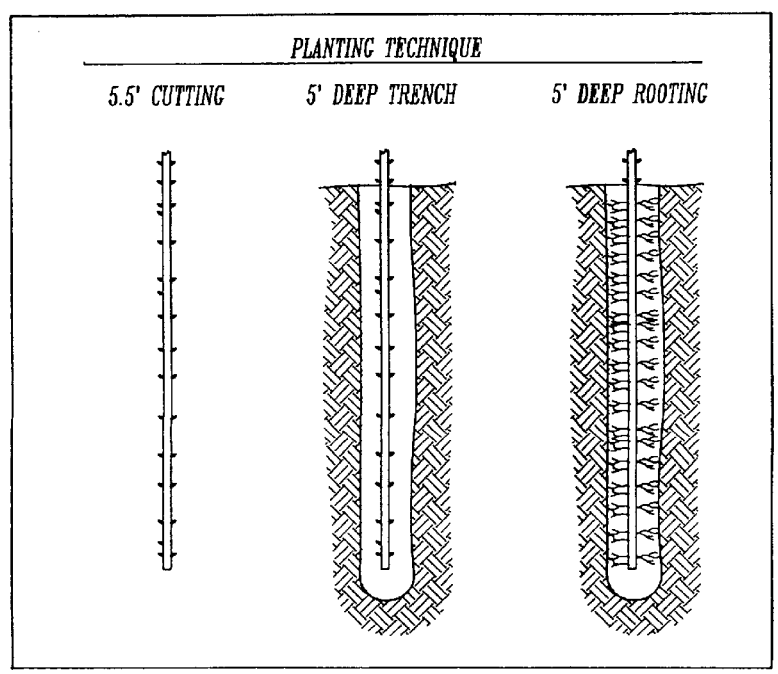
FIG. 6 shows a schematic planting method used for poplar cuttings.

In order to achieve this goal, it is necessary to select a tree to be planted which is capable of extremely deep root growth, and which has an extensive root system. The tree selected must have a perennial root system in order to have minimum root shutdown, and also must have preformed root initials. The tree selected must be phreatophytic—capable of surviving though the root system is partially or totally submerged periodically by the water table. As a result of having such preformed root initials, the tree stem cutting will form roots the entire buried length of the stem. This provides for root purposely placed to desired soil depth near the ground water table and effect nutrient and water uptake and maximum root network within the soil. FIG. 5 (top portion) shows a conventionally row cropped riparian zone with the bottom portion showing a deep rooted riparian buffer. FIG. 6 shows the method used to grow roots (150 cm) deep in the soil profile. It is also preferred that the tree selected, in order to obtain the maximum benefits, has fast wood and leaf growth in order to quickly replace that which has been harvested; is capable of cut stem rooting for better root growth and faster regrowth; and is capable of resprouting from a stump in order to maintain the present root system, for fast regrowth, and to decrease effort expended in replanting after harvesting. Fast wood and leaf growth also results in improved nitrate, nitrogen and phosphorous uptake, and improved water uptake with a larger mass of water removed from the soil. Trees which have a high protein content in the leaves also provide for improved crop value. Poplar, sycamore and willow trees are examples of such trees. Quadrennial trees may also be employed.

The poplar trees, in addition to having preformed root initials, have all of the advantages which are listed. It has a fast wood growth rate, as measured in terms of biomass matter grown per square foot of soil surface. The rate of growth for a poplar average 0.5 pounds of biomass dry matter per square foot per growing season. This can be compared to corn, which is considered to be an annual plant with a fast growth weight, and has a rate of 0.33 pounds of biomass dry matter per square foot per growing season. Trees which have fast growth rates are very effective in using sunlight, water, and carbon dioxide to grow biomass. A tree which is 50% faster in such growth rates as compared to corn is considered to have an excellent growth rate. Poplar and willow trees are the most preferred tree to be used in this method.

Trees from these selected species are then intentionally grown to depths that intersect the near-surface water table. It is difficult to culturally control rooting depth when planting a seed or short plant cutting. By using trees having preformed root initials, root sprouting from the entire planted stem's buried length is possible. By planting the cutting deeply and densely, one can get extremely deep root growth and control the root growth achieved.

The cuttings must be planted so that at least two viable buds are showing above the ground. The cutting must be planted at least adjacent the ground water, and it is preferred that it be planted so that it is actually in the water table, or even below it. It is possible to plant it more shallowly so that it does not actually intersect the water table when first planted, but it is then less possible to predict if sufficiently deep root growth will be achieved.

The length of the cutting will vary depending upon the area selected for planting, and the location of the ground water table. As demonstrated in the example below, the cutting is most often from 1 foot to 6 foot in length. The best results were achieved with 6 foot cuttings which had better growth rate and deeper root systems then their shorter counterparts. When the six foot cutting is used, a trench of 5 feet is dug, and the cutting placed within so that 1 foot is showing above ground. Preferably, at least 2 feet of the stem is in the ground.

As a result, roots will develop along the entire planted depth within a short time of planting. The presence of living roots along the entire submerged cutting depth allows significant nitrate and other pollutant uptake from near surface ground water. Additionally, the extensive root system also provides for vastly improved soil stabilization, and will inhibit the movement of other pollutants.

It was the surprising result in employing this method that the roots were viable at and below the water table. It had been expected that the root system could not survive at these levels. But, by selecting these particular types of trees, and planting them in this manner, they not only were viable but continued to grow extensively, picking up nitrate and related pollutants and through its extensive root system providing for significant soil stabilization.

In achieving the goals of the invention, it is also necessary to plant the cuttings densely. By planting the trees densely, one is able to achieve significant nitrate and other pollutant uptake and inhibition. Further, the related environmental benefits are also enhanced by such dense planting. Dense planting provides for improved wind break, wildlife habitat and inhibition of soil erosion. When planted very closely together, it is possible that the trees may have some stunted growth because of the lack of room to expand, however, it is difficult to plant the trees too closely together. The best benefits have been obtained by planting the trees at a density of 3 ft.$^2$ per tree to 10 ft.$^2$ per tree. The most preferred density which has been found is approximately 3.3 ft.$^2$ per tree. At this density, it is possible to achieve a goal of 400 lbs. of nitrogen uptake per year by the second growing season. Planted too far apart, and the environmental effects will be lost, and nitrate uptake diminished. Planting at greater than 25 ft.$^2$ per tree results in a decrease of these benefits.

In seeking to achieve the goal of providing for a harvestable crop, the trees are preferably planted in rows sufficient to allow tractors and other farm equipment to be used for cultivation of the crop. The exact dimensions used are not critical, as long as the equipment can sufficiently maneuver for practical usefulness in cultivation. As set forth in the example below, in row spacing of 30 cm. (1') was employed, and between row length used was approximately 1 meter (3.3').

Obviously, no fertilizer should be used in cultivating this crop, since it would merely add to the problem which is being removed by planting the trees.

The area where the crop is to be planted will vary depending upon the exact goal which is to be achieved. Two primary sources of placement include the riparian area, adjacent to the stream or water source which is to be decontaminated, or, the crop may be placed closer to the source of pollution.

For example, the tree crop may be planted in a riparian strip between a creek and a corn crop. Alternatively, it could be planted in a tillable landfill, in order to remove pollutants as they leave the landfill; at the cap of a land fill, in order to remove water to reduce pollutant migration at the source; adjacent to munitions plants, which produce considerable amounts of nitrate pollution; or adjacent chemical spills, radio-nuclide processing, or other pollutant sources.

By providing for selection of a tree and planting methods which allow the tree to be used as a crop, economic incentive is provided that uses natural means of pollutant removal. The crop may be harvested on a biennial or triennial basis, and the most common method would be to harvest one half of the crop every two years. It is necessary to harvest no more than one half of the crop at any one time, in order to maintain the environmental benefits. The resulting crop may be used for a variety of products. For example, poplar trees may be used in the form of the leaf product or chipped fiber products, to ultimately become pulp, feed additives, or a renewable source of fuel. The deep root system is maintained, even in the areas where the crop has been harvested, thereby maintaining pollutant removal or inhibition. By selecting for trees with cut stem rooting, resprouting from the stump, and fast root growth, maximum benefits from the crop are maintained through quick regrowth.

The result is a significant pollutant removal or inhibition method. The natural nutrient uptake by the trees is employed in removing such pollutants as nitrates, ammonianitrogen, and phosphorus from near surface ground water supplies. The nutrient is taken up by the roots from the soil and is metabolically transformed into a harvestable protein. Plants require a variety of chemicals to sustain healthy growth, including carbon, hydrogen, oxygen, nitrogen, sulphur, phosphorus, potassium, calcium, magnesium, copper, zinc, molybdenum and chlorine. The significant nitrate uptake which is achieved is demonstrated in FIGS. 1 through 4, with the accompanying reduction of the pollutant within the soil. Such buffer strips may be used for a final polishing of effluents from municipal and industrial waste water treatment plants, nutrient removal from septic and small domestic lagoon treatment systems, nutrient removal from non-point agriculture runoff into creeks, nutrient removal from non-point urban storm water runoff, nutrient removal from livestock confinement pasture and feedlot runoff, among others.

Atrazine™ is another pollutant which may be removed by uptake by the trees. In research performed in 1989, it was demonstrated that Atrizine™ applied to both corn and deep-rooted poplar buffers was less concentrated in the near-surface ground water below the trees. A very significant decrease ($p < 0.01$) in Atrizine™ concentration in the near-surface ground water occurs if tree cuttings are planted using the Ecolotree Buffer™ technique when equal quantities of Atrizine ™ herbicide is applied to similar size corn and tree buffer plots.

This is significant because it demonstrates that synthetic organic carbon-containing pollutants will be removed from the near-surface ground water due to adsorption to the roots and root exudates. The roots influence the water movement, and it is expected that roots will retard movement of herbicides, solvents, and other hydrocarbons through the soil, giving soil-borne microbes greater opportunity to mineralize the water-contaminating chemicals.

Other organic solvents may be removed by sorption to the organic carbon root system which is placed deep within the soil, and, through the planting technique employed, these pollutants are biometabolized by soil microbes stimulated by the increased available organic carbon from the plant. This method, in addition to the possible uptake by the plant, can provide for a separate means of pollutant removal. Synthetic organic compounds which may be removed by sorption to rooted soils include TCE, carbon tetrachloride, benzene, petroleum fuel and lubricant spills, trichloro-ethyl, methyl-ethyl, keytone, and other common solvents. These solvents are often found, for example, in landfill leachates. The buffer strip may be employed at manufacturing sites with soils contaminated by organic solvents, metal finishing/plating wastes, chemical spills, and land fill leachates.

Yet another means by which the buffer strip removes or inhibits pollutants is by the stabilization of heavy metals and radioactive isotopes in the soil mass. The tree root system stabilizes the soil by reduced disturbance of the surface. The deep-planted root system provides for reduced leaching by decreasing the mass of water flowing through the soil profile as a result of the root uptake and evapotransporation. Potential for metal removal from the soil profile may be achieved by uptake and subsequent harvest. Examples of pollutants which may be removed by this method include cadmium, copper, arsenic, zinc, chromium, mercury, uranium and plutonium.

Also, by stabilizing soil through the dense tree root system, it is possible to stabilize toxic organic compounds absorbed to the soil particle surface. The buffer is planted so dense that wind energy is dissipated at the ground surface on a year round basis. Potential applications include planting such strips at manufacturing sites contaminated by metal finishing/plating waste, at chemical spills along transit routes, at the toe of landfills, and surrounding nuclear fuel or weapons processing facilities. Obviously, there are numerous potential applications for this method.

The following is set forth by way of example, and is not intended as a limitation of the invention.

EXAMPLES

Example 1

Ecolotree Buffer™ Planted With Deep Roots Bordering Streams and Drainages

Tree Plot Layout and Installation

The prototype buffer strip was installed May 17, 1988. The site selected for installation of the 1988 poplar tree buffer test plot was at the Amana Society Farms, Amana, Iowa. Farming of rotated crops occurred up to the creek bank edge with the 1988 crop being oats.

The total buffer test strip consisted of four adjoining plots running parallel to the creek, each measuring 3 m by 12 m (10 ft. by 40 ft.) in size. A 4.5 m (15 ft.) wide fallow strip was included as a drive for equipment and separated the trees from the creek. This planting plan is typical for riparian buffers; the land use is a long corridor that removes a relatively small portion of the farmland from commodity crop agriculture.

The initial planting density of poplars was 33,000 trees/hectare (13,000 trees/acre) for an area allocation per tree of 0.3 $m^2$/tree (3.3 $ft^2$/tree). Each plot had four rows planted with a between-row tree of 1 m (40 in) apart and an in-row tree spacing of 30 cm (1 ft). Plot #2 was planted with 1172 cuttings each 1.8 m (6 ft) long and planted 1.5 m (5 ft) deep as shown in FIG. 3. A trencher dug five-foot deep trenches parallel to the creek the 12 m (40 ft) width.

Plots were planted with 160 cuttings measuring 30 cm (1 ft) in length. The final poplar buffer strip was 3 m×120 m (10 ft×400 ft).

The field was tilled to a depth of 15 cm (6 in) to breakup the topsoil and remove all surface vegetation. The treed buffer strip bordered corn planted upgrade using conventional farming practices. Tree culturing practices included weeding using tractor or hoe tillage without the use of herbicides. No fertilizer was added to the soil both in the buffer strip or on the upgrade oat field during 1988. Corn was grown in 1989; anhydrous ammonia fertilizer was applied at the rate of 168 kg N/ha (150 lb N/acre) in March before the growing season.

Root Placement and Growth

Results from the first two growing seasons have demonstrated that Populus spp. cuttings rooted their entire buried depth when 1.8 m (6 ft.) cuttings were planted to depths of 1.5 m (5 ft.) in field plots. Roots grew from preformed roots initials located below the stem's epidermis which emerged the entire buried depth.

The tree root presence and the planting technique significantly impacts the soil profile. The 1 ft. long cuttings were planted 10 in. deep and 6 ft. long cuttings were planted 5 ft deep in the plot soil. For 1 ft. cuttings, roots grew primarily with the top 45 cm (18 in.) of soil, though there were several thin roots that grew down 6 ft. into the soil.

The 6 ft. cuttings developed roots the entire buried 1.5 m (5 ft.) length. An average of 20 primary lateral roots with secondary roots developed from the deep-planted cutting at depths four to five feet below the soil surface. The mass ratio of root/stem for both the 1 ft. and 5 ft. cuttings averaged 0.59.

The in-field rooting success corroborate a greenhouse experiment which demonstrated that adventitious rooting occurred the entire planting length of a poplar cutting. The greenhouse experiment using 4 ft deep growing chambers allowed control of root submergence by a near-surface water table. The plexiglass wall of the 1.2 m (4 ft) deep planters permitted observation of the root development during a six month period.

Roots developed the entire planted depth within two weeks of planting. Water table submergence did reduce root growth but did not kill them nor halt their apparent functions of nutrient and water uptake during the 105 day greenhouse test period. The bulk of the root mass occurred at the interface of the saturated and vadose zones in the soil profile. Roots grew most vigorously in a zone 20 cm (8 in) above and below the water table.

Stem Growth

During the 1988 growing season, the mean tree mass for 1 ft cutting plots was estimated at 39 gm for the entire population based on ten trees sampled by measuring base diameter and height. The mean tree mass for the 5 ft cutting plot was estimated at 138.6 gm using the same technique.

The date Apr. 10, 1989 was used as the beginning date for the 1989 growing season. The 1989 biomass growth rate was estimated using whole trees harvested from interior rows of plots on Jul. 7, Sep. 6 and Sep. 28, 1989.

There is no statistically significant difference ($p>0.1$) between the 1 ft and 5 ft cutting growth rate for the second growing season. There is a significant difference ($p<0.05$) between the growth rate intercepts, which indicate that the 1 ft cuttings started the second growing season significantly smaller than the 5 ft cuttings.

The overall average growth rate is estimated to be 5.4 grams stem dry matter growth per day. The leaf/stem ratio averages 0.30 for combined samples from 1 ft and 5 ft cuttings. For every pound of stem grown in the second growing season, approximately 0.30 pounds of leaf is produced. This ratio is useful in planning the management strategy in harvesting the nitrogen and the carbon from the site.

Nitrate N in Soils

Figure 1:
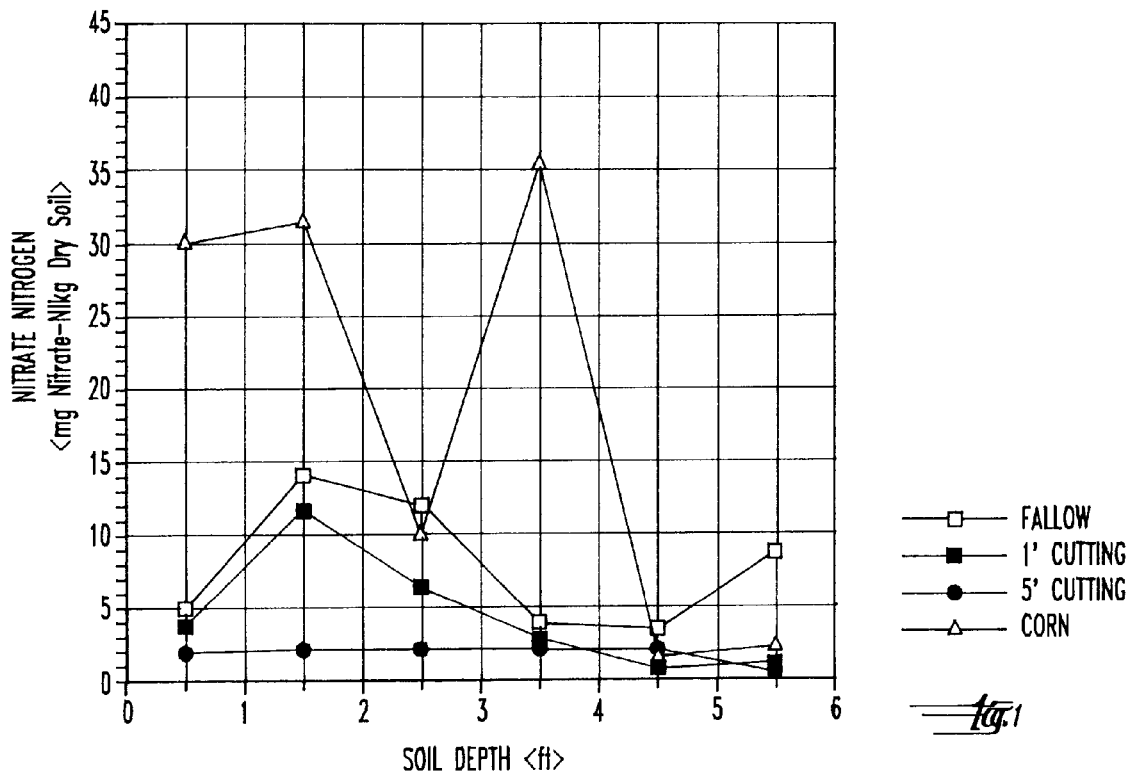
FIG. 1 is a graph showing average nitrate-nitrogen concentration in plot soils in fallow areas, areas with one foot tree stem cuttings, five foot tree stem cuttings, and areas where corn was grown.

The means of the nitrate N analyses for triplicate soil samples is shown in FIG. 1. The soil samples for the 5 ft deep-rooted trees were taken from soils inside the backfilled trench. The nitrate concentration in the trench planted with the deep-rooted poplar cuttings averages a very constant 2–3 mg N/kg dry soil. The nitrate concentration profile for the 5 ft cutting plot is very significantly different ($p<0.0005$) from all other plots.

The shape of the nitrate curve for the fallow plot is characteristic of an agricultural soil growing shallow rooted plants. There is no significant difference ($p>0.1$) in the nitrate concentrate profiles between the fallow and 1 ft cutting plots.

The nitrogen concentrations below corn in the soil profile show values ranging from 10 to 35 ppm in the top four feet. There is an anomaly in the data for a low nitrate concentration average in the three-foot-deep sample; there is no research data explaining the overall concentrations in the profile. There is a very significant difference ($p<0.0005$) between this corn nitrate profile and all other plot treatments. This nitrate difference is attributed to the addition of 150 lb $NH_3N$/ac anhydrous ammonia fertilizer into the cropped soil in March 1989; application was followed by microbial nitrification to nitrate.

It is apparent that there was nitrate uptake by the tree roots the entire buried cutting depth. This nitrate removal by the deep-rooted cuttings corroborates the nitrate concentrations in piezometer samples.

Nitrate Concentrations in Piezometers

Three piezometers were installed upgrade, midplot, and downgrade of the poplar plots. There had been a severe lack of precipitation on these fields up to September 1989 rainfall events. Until these rains, the groundwater table was below the bottom of the creek drainage channel and there was no water table intersecting the 5 ft deep-rooted trenches. All piezometers water samples were pumped on dates 11, 18 and 27 of Sep., 1989.

Figure 2:
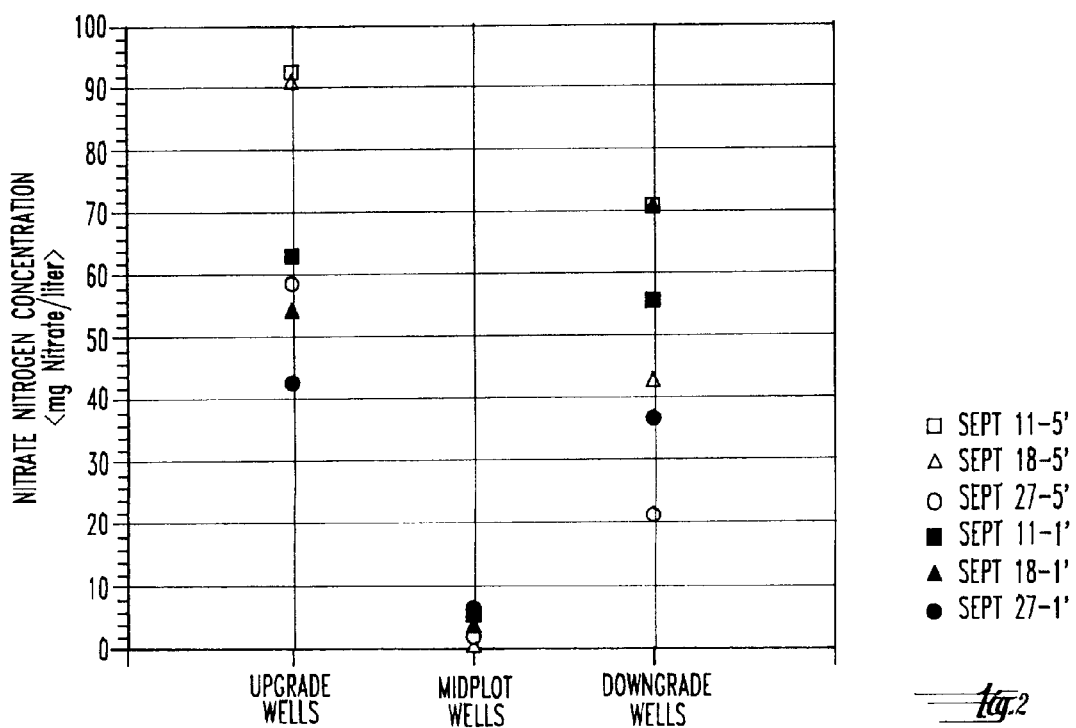
FIG. 2 is a graph showing average nitrate-nitrogen concentrations in the areas as indicated.

FIG. 2 shows the average groundwater nitrate concentrations in triplicate samples pumped from the piezometers transecting the 5 ft cutting plot and the 1 ft cutting plot. There were no functioning lysimeters on this site, so it can only be speculated that the September rains created a wetting front that moved primarily downward through the soil profile. The nitrate in the near-surface groundwater immediately following the rainfall event reflects infiltration through the soil matrix and macropores. There is little influence from lateral horizontal base flow below the water table. In both the downgrade fallow soils and the upgrade row-cropped soils, nitrate concentrations were higher than those measured in the 5 ft and 1 ft cutting buffers (shown in FIG. 1).

There is a very significant difference ($p<0.0005$) between the plot wells. There is very significant difference ($p<0.0005$) between the wells located midplot compared to the wells located upgrade and downgrade. The nitrogen in the upgrade wells and in upgrade cropped soils reflect both the background nitrogen in the soil and the fertilizer addition of 150 lb/N/ac. The nitrogen in the down gradient wells reflect the background nitrogen in the soil, though no fertilizer was added during the 1988 and 1989 growing seasons. Though there was some weed growth on this fallow plot, there was much less plant growth and much less subsequent nitrogen uptake by plants during the 1988 and 1989 growing seasons. There is no significant difference ($p<0.1$) between the midplot wells between the 1 ft and 5 ft cutting plots. There is no significant difference ($p<0.1$) between the upgrade and downgrade plot nitrate concentrations in the piezometers.

Nitrogen in Poplar Stem and Leaf

The total nitrogen content in 1 ft and 5 ft rooted trees were 10.73 gm/tree and 9.37 gm/tree respectively, analyzed from triplicate samples cut Sep. 27, 1989. The estimated stem and leaf nitrogen mass uptake during the second growing season is shown for trees grown from 1 ft and 5 ft cuttings in FIGS. 3 and 4 respectively. There is no statistically significant difference ($p<0.1$) in the rates of nitrogen uptake between 1 ft and 5 ft cuttings.

The nitrogen measured in the plant leaf and stem was removed from the soil solution nitrogen reserve. This nitrogen concentration data for tree stem and leaf material permit a nitrogen mass uptake curve to be estimated for the 1 ft and 5 ft cutting plots. There is no statistically significant difference ($p<0.1$) for the stem and leaf nitrogen content between 1 ft and 5 ft cuttings.

It is noted that the leaf N concentration decreases with the progress of the growing season but the overall nitrogen content of the plant increases. The tree N content starts at 2.6% and decreases to 1.97% on a dry weight basis through the sampling period. The nitrogen concentration in the stem seems to fluctuate between 0.3% to 0.5% on a dry mass basis throughout the sampling period. Thus, it can be seen by selecting particular trees and using the planting method described, these trees form roots the entire buried length, deep into soil and are viable within and below water tables. The tree types and planting method significantly reduced nitrate nitrogen mass in the soil profile and nitrate in near surface groundwater. The nitrate was transformed into the protein and a harvestable economical crop.

Thus, it can be seen the invention at least achieves its goals.

EXAMPLE 2

Ecolotree Buffer™ Principles Applied To Capping a Landfill For Closure

Deep-rooted trees five feet long and two feet long were planted on the cap of a landfill to uptake by roots, the water infiltrating the soil cap layer. The water uptake by roots prevents further leakage of water into the filled material, reducing leachate creation. Reduced leachate creation reduces the potential of leachate contaminating surface or ground water supplies.

The fast growing poplar trees were planted densely at a rate of 1 tree/4 ft.$^2$±. Instruments collected data that demonstrate the concept that deep-rooted trees can evapotranspire water from depths greater than no cover plants or grass. An installed site measured the long-term effectiveness of a perennial root system to remove water added due to precipitation to the landfill cap during the growing season. During the dormant season, the tree planted cap was dewatered to sufficient depth such that water in filtrating through the cap first had to rehydrate the rooted soil depth.

Thus, this deep-rooted tree cap prevented the movement of pollutants by restricting the water leaking through the soil surface and entering buried sources of pollution, subsequently forming leachates which could migrate to drinking water supplies.

EXAMPLE 3

Ecolotree Buffer™ Principles Applied To Reducing Heavy Metal And Arsenic Leaching From Mine Tailings Deep-rooted trees were used to stabilize arsenic leaching from gold ore tailings to surface water supplies. By the uptake of water infiltrating through contaminated soils, or tailing piles, the mass of water leaching through material is reduced. This uptake of water decreases leachate creation and its potential of migrating to water supplies or uncontaminated soils.

The tree buffers were also demonstrated as a way to replant strip-mined soils where they perform the role of stabilizing soils, reducing water contamination, and restablishing a soil/plant/animal ecosystem.

This concept is applicable to sites denuded of vegetation by mining, or other industrial activity, where the trees begin the revegetation sequence as well as reducing the mass waterleached compounds containing heavy metals leaving the disturbed site.

What is claimed is:

1. A method of reducing leachate from contaminated soils or landfills, said method comprising:

planting perennial tree stems having an upper and lower end and preformed root initials at a depth such that at least two buds at the upper end of the stem are above the ground and at least two feet of the lower end is buried; and allowing the stems to develop roots to remove water from the soil, thereby preventing further leakage of water into the contaminated material and reducing leachate creation.

2. The method of claim 1 wherein said stems are planted so that the lower end is at least two feet below the ground.

3. The method of claim 1 wherein said stem develops roots along the entire buried length of the stem to allow water uptake from all levels along the depth of the stem.

4. Method of claim 1 wherein said planting is along the cap of a landfill.

* * * * *